(12) United States Patent
Ngan (10) Patent No.: US 7,853,294 B1
(45) Date of Patent: *Dec. 14, 2010

(54) METHOD AND SYSTEM OF SELECTING ANTENNAS AND EQUIPMENT FOR USE WITHIN A WIRELESS COMMUNICATION SYSTEM

(75) Inventor: John Cheong-Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 463 days.

This patent is subject to a terminal disclaimer.

(21) Appl. No.: 11/477,880

(22) Filed: Jun. 29, 2006

Related U.S. Application Data (63) Continuation of application No. 10/155,057, filed on May 24, 2002, now Pat. No. 7,099,695.

(51) Int. Cl.
*H04M 1/00* (2006.01)
*H04B 3/36* (2006.01)
*H04B 7/14* (2006.01)

(52) U.S. Cl. .................. 455/562.1; 455/7; 455/15; 455/17

(58) Field of Classification Search ........... 455/561, 455/562.1, 63.4, 67.11, 101, 69, 132, 25, 455/525, 524, 552.1, 7, 13.1, 15, 17
See application file for complete search history.

(56) References Cited

U.S. PATENT DOCUMENTS

| | | | |
|---|---|---|---|
| 5,628,052 A | 5/1997 | DeSantis et al. | |
| 6,108,323 A | 8/2000 | Gray | |
| 6,351,638 B1 * | 2/2002 | Robinson | 455/418 |
| 6,433,737 B2 | 8/2002 | Katz | |
| 6,493,545 B1 * | 12/2002 | Sugaya | 455/272 |
| 6,600,918 B1 | 7/2003 | Youngs et al. | |
| 6,600,934 B1 | 7/2003 | Yun et al. | |
| 6,609,012 B1 | 8/2003 | Malmgren et al. | |
| 6,611,695 B1 | 8/2003 | Periyalwar | |
| 6,697,642 B1 | 2/2004 | Thomas | |
| 6,731,905 B2 | 5/2004 | Ogino et al. | |
| 6,751,480 B2 | 6/2004 | Kogiantis et al. | |
| 6,801,790 B2 | 10/2004 | Rudrapatna | |
| 6,819,940 B1 * | 11/2004 | Kosaki | 455/552.1 |
| 7,099,695 B1 * | 8/2006 | Ngan | 455/562.1 |
| 2002/0032031 A1 * | 3/2002 | Ogino et al. | 455/435 |
| 2005/0170832 A1 | 8/2005 | Cooper | |

* cited by examiner

*Primary Examiner*—Un C Cho (57) ABSTRACT

A method and system of selecting antennas and/or equipment for use within a wireless communication system is disclosed. A cell site may have one antenna-arrangement shared between multiple groups of radio equipment that are each operated by respective wireless service providers at the cell site. The cell site may also have a base station controller that may select from the shared antenna-arrangement an antenna for radiating signals from the groups of radio equipment. The base station controller may also select from the multiple groups of radio equipment a group of radio equipment for processing signals received at the shared antenna-arrangement.

17 Claims, 7 Drawing Sheets

METHOD AND SYSTEM OF SELECTING ANTENNAS AND EQUIPMENT FOR USE WITHIN A WIRELESS COMMUNICATION SYSTEM

REFERENCE TO RELATED APPLICATION

This is a continuation of U.S. patent application Ser. No. 10/155,057, filed May 24, 2002, the entirety of which is hereby incorporated herein by reference.

FIELD OF THE INVENTION

The present invention is related to wireless communication systems, and more particularly, to a method and system of selecting antennas and equipment for use within a wireless communication system.

DESCRIPTION OF RELATED ART

In a typical wireless communication system, an area is divided geographically into a number of cell sites, each defined by one or more radiation patterns created by an emission of radio frequency (RF) electromagnetic (EM) waves from a respective base transceiver station (BTS) antenna. For wireless communications, EM signals are not sent through a transmission line, and therefore antennas are required for the transmission and reception of the signals. A group of antennas or an antenna array may be used. An antenna array is a set of antennas working together to produce a particular radiation pattern. Each antenna in the array is referred to as an antenna element (or simply an element).

An antenna can radiate in a specified direction or directions. An antenna produces a radiation pattern, which may either be uniform or non-uniform. A uniform radiation pattern (i.e., omni-directional pattern) may result due to energy radiating from all parts of the antenna and arriving at a distant point at the same time or in phase. As the antenna becomes larger, the radiated energy is distributed in time and does not always arrive at a distant point at the same time. When the energy arrives at different time intervals, the energy does not always add in phase and the result may be a lower amount of received energy resulting in a smaller non-uniform antenna radiation pattern.

An antenna radiation pattern is also referred to as an antenna-beam or beam. A beam width of an antenna is a measure of directivity of an antenna and is usually defined by angles where the radiation pattern reduces to one half of its peak value or more commonly referred to as 3 db points (i.e., 3 decibel power level).

In the typical wireless communication system, each cell site has a BTS, which physically consists of a tower, antennas, and radio equipment. The tower is a large upright structure that to provides a frame to mount the antennas. The tower may house multiple antenna systems, and each antenna system may have multiple antenna-elements.

Cell sites are operated by one or more wireless service providers (WSP). A WSP is a company that provides telecommunications through RF signals rather than (or in addition to) through end-to-end wire communication. Each WSP employs a wireless signaling protocol. For example, wireless signaling protocols such as global system for mobile communications (GSM), code division multiple access (CDMA), etc., can be used by WSPs to provide services such as personal communication system (PCS), personal digital cellular (PDC), personal handy phone system (PHS), and others. Communications from a mobile station to a BTS (i.e., reverse link communications) and from a BTS to a mobile station (i.e., forward link communications) are completed using such protocols.

In existing cell sites, each WSP supplies its own antennas and radio equipment. However, multiple wireless service providers may share one tower due to a lack of geographic sites for telecommunication towers and/or to reduce costs. Therefore, a BTS may have multiple groups of radio equipment (i.e., a group of radio equipment may include a receiver, a transmitter, or other equipment) and multiple antennas. Each group of radio equipment may correspond to a separate group of antennas mounted on the tower and to a respective WSP.

When multiple WSPs are served by a single cell site, a large number of antennas and connecting wires (i.e., feeder cables) are required at the cell site to provide air interfaces between mobile stations and radio equipment corresponding to the multiple WSPs, because each WSP needs its own antenna or antennas. In addition, a WSP itself may operate using multiple radio frequencies, and the WSP may require a separate antenna for each radio frequency.

Unfortunately, however, a significant number of towers were originally built to accommodate only a single set of antennas or were imposed with height limitations that have effectively limited the towers to one or two sets of antennas. In addition, many towers have limited space, thus restricting their ability to host multiple antennas, and therefore restricting their ability to host multiple WSPs. Further, installing a large number of antennas is burdensome and costly. Consequently, a system that overcomes these problems is desirable.

SUMMARY

In an exemplary embodiment, a method is provided that includes receiving a signal that has a system identification code (SID) and determining the SID of the signal. The method further includes, based at least in part on the SID, selecting one or more antenna-arrangements to radiate the signal and sending the signal to the one or more antenna-arrangements to be radiated. In an alternate exemplary embodiment, the method includes, based at least in part on the SID, selecting a group of equipment from a plurality of groups of equipment to process the signal and sending the signal to the group of equipment.

In another embodiment, a base station controller is provided that has a communication interface for sending and receiving signals. The base station controller also has a processor connected to the communication interface. Additionally, the base station controller has machine language instructions stored in data storage and executable by the processor to perform functions including determining an SID of a respective signal and, based at least in part on the SID, selecting one or more antenna-arrangements to radiate the respective signal and sending the signal to the one or more antenna-arrangements to be radiated.

In still another embodiment, a system is provided that has one or more antenna-arrangements that are each operable to provide a radiation pattern defining an air interface for radiating and receiving signals. The system also has a base station controller connected to the one or more antenna-arrangements and a plurality of groups of equipment connected to the base station controller. The base station controller may determine a respective SID of each signal, and based at least in part on the respective SID, the base station controller may select one antenna-arrangement from the one or more antenna-arrangements for radiating signals. The base station controller may then send the signals to that selected antenna-arrangement. The base station controller may also select a group of equipment from the plurality of groups of equipment to process received signals.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

A. Wireless Communication System

Figure 1:
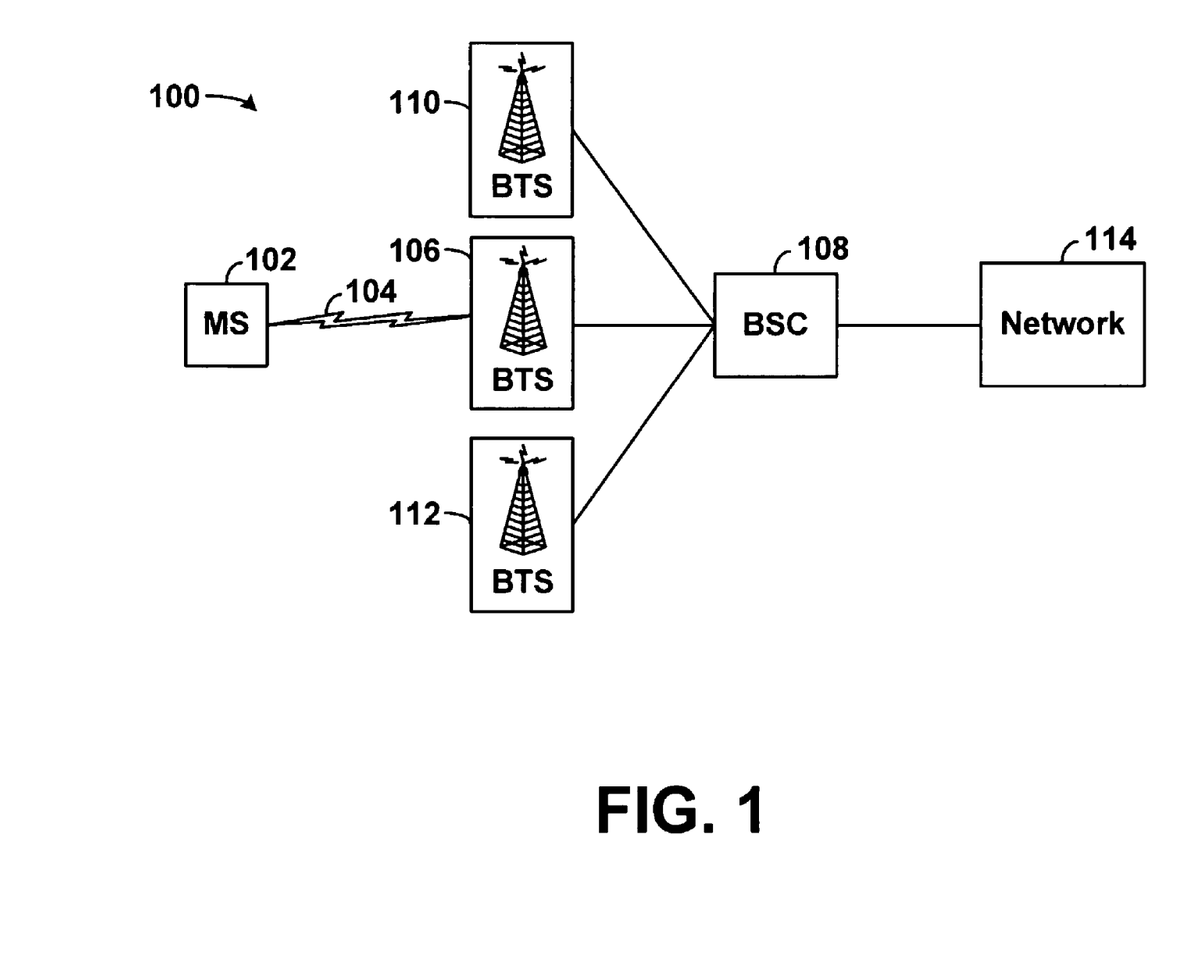
FIG. 1 is a block diagram illustrating one embodiment of a wireless communication system.

In accordance with an exemplary embodiment, a method and system of selecting antennas and/or equipment for use within a wireless communication system, such as a cellular communication network for instance, is provided. Referring to FIG. 1, a block diagram illustrating one embodiment of a wireless communication system 100 is provided. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include a mobile station (MS) 102 in communication via an air interface 104 with a base transceiver station (BTS) 106, which is coupled to a base station controller (BSC) 108. The BSC 108 is also coupled to a network 114. Mobile stations such as cellular telephones, personal digital assistants (PDA), wireless modems, or other mobile nodes may be used in the wireless communication system 100.

BTS 106 includes one or more antennas arranged to produce radiation patterns defining one or more sectors. Additional BTSs 110 and 112 coupled to BSC 108 are also illustrated. Although three BTSs are illustrated within FIG. 1, it will be understood that more or fewer BTSs may be present within the wireless communication system 100.

BSC 108 is an interface between BTSs 106, 110, and 112 and the network 114. BSC 108 also handles radio resource management and radio network management functions for BTSs 106, 110, and 112.

The network 114 may be any transport network and/or entity used to route signals to and from the MS 102. For example, network 114 may comprise a mobile switching center (MSC), a packet data service node (PDSN), an Internet protocol (IP) network, the public switched telephone network (PSTN), or any other wireless communication transport network. In addition, network 114 may allow for connectivity to multiple switching platforms, such as a short message service center (SMSC) and an uplink server, for example.

Each of the couplings of the wireless communication system 100, excluding the air interface 104, may be interfaces such as a trunk level 1 (T1) line, an Ethernet line, a signaling link, or other connections.

The wireless communication system 100 may be divided geographically into a number of cell sites. At the core of each cell site is a BTS, such as BTSs 106, 110, and 112, whose antennas define a radio frequency (RF) radiation pattern. Further, each cell site may be divided into a number of sectors, each defined respectively by radiation patterns from directional antenna elements of the cell site's BTS. Each sector typically has a beam width of about 120 degrees. However, sectors can have any desired beam width.

The radiation pattern of each sector in a cell site produces an air interface that defines a respective coverage area, such as air interface 104. When an MS is positioned within such a coverage area, the air interface provides a communication path between the MS and the BTS. And the MS can then communicate through this path with entities on the wireless communication system 100.

In the wireless communication system 100, WSPs of the BTSs 106, 110, and 112 may transmit signals using one or more carrier frequencies. A carrier frequency (or simply carrier) is a transmitted electromagnetic pulse or wave at a steady frequency of alternation on which information can be imposed by increasing signal strength, varying the frequency, varying the wave phase, or other means. This variation is referred to as modulation. Types of analog modulation of a carrier may include amplitude modulation (AM), frequency modulation (FM), and phase modulation. Types of digital modulation may include varieties of pulse code modulation (PCM), including pulse amplitude modulation (PAM), pulse duration modulation (PDM), and pulse position modulation (PPM).

In addition, in the United States, each WSP is assigned an SID (e.g., a unique five-digit number) by the Federal Communications Commission (FCC), to differentiate communications (e.g., wireless signaling) between mobile stations and a respective WSP. Assignment of an SID from the FCC authorizes a WSP to transmit wireless signals in an area. The SID may be transmitted within wireless signals as a binary string of one's and zero's.

An MS is typically registered with one WSP and the MS may be assigned the SID of that WSP. In communications between a BTS and an MS, the SID identifies the WSP that the MS is registered. The MS may be programmed to use telecommunication services of its registered WSP, thus the MS may continuously monitor the air interface for carriers that have the assigned SID of the MS.

A wireless signal may take any form including analog and digital signals. As an example, a wireless signal may comprise frames, slots, and channels that organize digital bits (i.e., electrical impulses translated into "1's" and "0's") of information. Frames hold slots (e.g., time slots), which hold channels. A sequence of bits makes up a frame. The first sequence of bits may be control information, such as a frame's length, its destination, and its origin. The second sequence of bits may be the information the frame carries, namely time slots. The third sequence of bits of a frame may be an error checking routine, known as "error detection and correction bits." The slots themselves can hold individual BTS-MS communication information, such as call information within the frame. The call information may be multiplexed pieces of conversation as well as signaling and control data. Specific time slots may be dedicated paired frequencies which are the channels. The SID may be transmitted within a control channel of a wireless signal.

B. Shared Antenna-Arrangement

Figure 2:
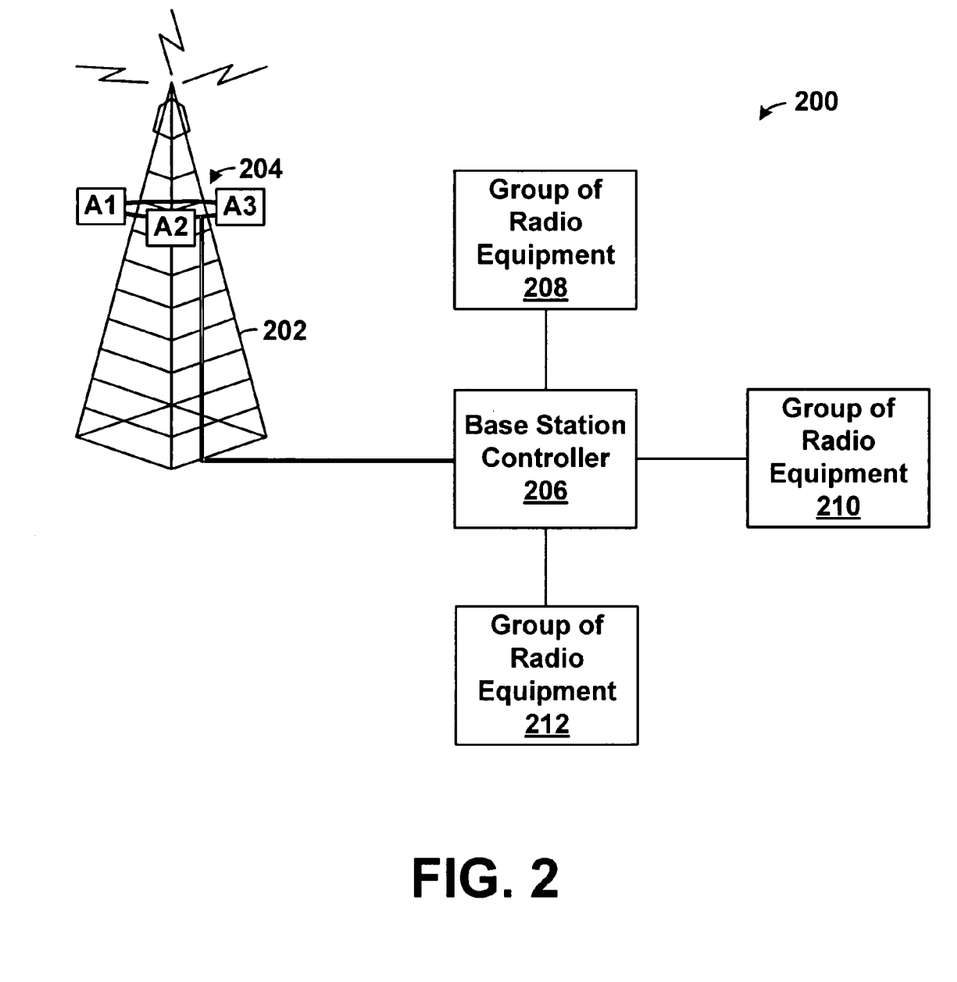
FIG. 2 illustrates one embodiment of a cell site.

According to one embodiment, WSPs may share a common antenna system or antenna-arrangement within a cell site. Referring to FIG. 2, one embodiment of a cell site 200 is illustrated. The cell site 200 may have a tower 202, an antenna-arrangement 204 (illustrated with three antennas (e.g., A1, A2, A3)), a base station controller 206, and multiple groups of radio equipment 208, 210, and 212. The antenna-arrangement 204 of the cell site 200 is connected to the base station controller 206, which is connected to each of the groups of radio equipment 208, 210, and 212. Each group of radio equipment 208, 210, and 212 may be operated by a different WSP. Alternatively, multiple groups of radio equipment in the cell site 200 may be operated by to the same WSP. Furthermore, multiple WSPs may operate the same group of radio equipment.

The connections between the antenna-arrangement 204 and the base station controller 206, and between the base station controller 206 and each of the groups of radio equipment 208, 210, and 212 may be direct connections as illustrated in FIG. 2. Alternatively, the connections may be indirect connections through intervening elements or systems, such as other antenna interfaces or cabling. Each of the connections, whether direct or indirect, may be a wired or a wireless connection.

The antenna-arrangement 204 may be any antenna system desired. Although only one antenna-arrangement 204 is illustrated, more than one antenna-arrangement may be present at the cell site 200 and connected to the base station controller 206. In addition, although the antenna-arrangement 204 illustrated in FIG. 2 only has three antennas (e.g., A1, A2, A3), the antenna-arrangement 204 may include any number of antennas. As used herein, the term antenna-arrangement 204 may refer to an antenna operable to produce a radiation pattern to transmit and receive wireless signals. The term antenna-arrangement 204 may also refer to a group of antennas, a rack of antennas, an antenna system, or an antenna array, which has multiple antenna elements. In addition, the term antenna-arrangement 204 may refer to multiple antenna systems, which have multiple antenna arrays. Other arrangements of antennas and antenna systems may also be used.

Each group of radio equipment 208, 210, and 212 may include a radio transmitter and a receiver that are able to process wireless signals. Other equipment may be present as well within the groups of radio equipment 208, 210, and 212. Although FIG. 2 only illustrates three groups of radio equipment, more or fewer groups of radio equipment may be connected to the base station controller 206.

The base station controller 206 may dynamically (i.e., in real time) assign antennas of the antenna-arrangement 204 (i.e., antennas A1, A2, and/or A3) to the WSPs operating at the cell site 200 in order to provide a communication interface between mobile stations and a corresponding group of radio equipment operated by a WSP. The assignment of an antenna may allow a WSP to have exclusive use of the antenna.

The base station controller 206 may also dynamically route signals received at the antenna-arrangement 204 to the groups of radio equipment 208, 210, and 212 through respective communication paths. A communication path may include a group of radio equipment, the base station controller 206, the antenna-arrangement 204, and an air interface.

The base station controller may additionally dynamically route signals received from the groups of radio equipment 208, 210, and 212 to antennas of the antenna-arrangement 204 to be radiated through a respective communication path.

An MS may subscribe to service by a particular WSP, such as Sprint Spectrum L.P. The MS may transmit wireless signals through an air interface, and an antenna of the antenna-arrangement 204, such as antenna A1, may receive the signals. The base station controller 206 will receive the wireless signals from antenna A1. The base station controller 206 may identify that the MS is a subscriber of Sprint Spectrum L.P. and route the wireless signal to the group of radio equipment owned by Sprint Spectrum L.P.

Signals may be sent from the group of radio equipment to the MS in a similar manner. The base station controller 206 may receive a signal from the group of radio equipment owned by Sprint Spectrum L.P. and the base station controller 206 may identify that the signal is to be sent to a particular MS that subscribes to Sprint Spectrum L.P. The base station controller 206 may route the signal to an antenna of the antenna-arrangement that has been assigned to Sprint Spectrum L.P. to be radiated to the MS.

Figure 3:
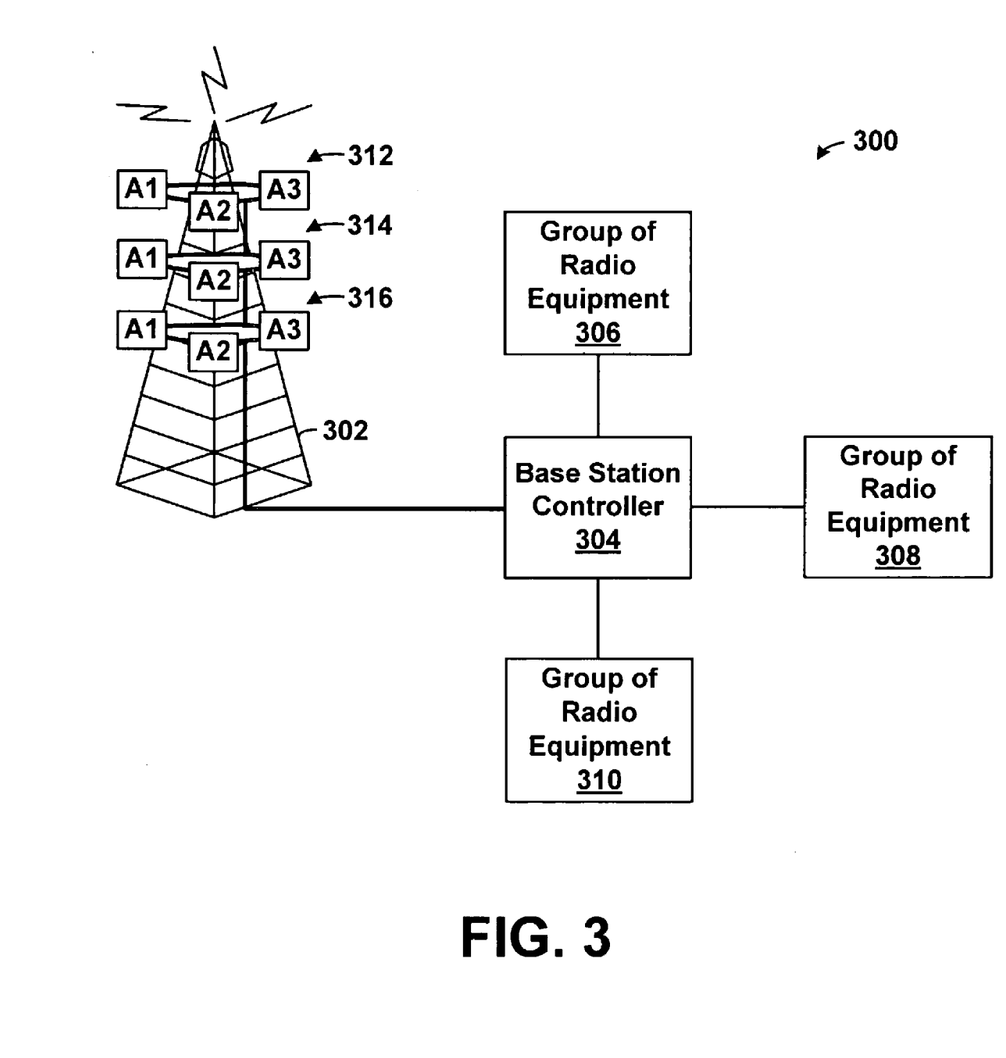
FIG. 3 illustrates another embodiment of a cell site.

FIG. 3 illustrates another embodiment of a cell site 300. The cell site 300 may be similar to cell site 200, since the cell site 300 has a tower 302, a base station controller 304, and groups of radio equipment 306, 308, and 310. However, cell site 300 has three antenna-arrangements 312, 314, and 316. The base station controller 306 may select one of the antenna-arrangements 312, 314, and 316 to radiate signals from the groups of radio equipment 306, 308, and 310. In addition, the base station controller 306 may select more than one of the antenna-arrangements 312, 314, and 316 to radiate signals for a respective group of radio equipment. The base station controller 306 may also select one or more of the antennas (i.e., A1, A2, A3) of the antenna-arrangements 312, 314, and 316 to radiate signals for a respective group of radio equipment. More or fewer antenna-arrangements may be present at cell site 300.

In addition, the base station controller 306 may select a group of radio equipment from the groups of radio equipment 306, 308, and 310 to process signals received at antennas of the antenna-arrangements 312, 314, and 316. More than one group of radio equipment may be selected as well.

Figure 4:
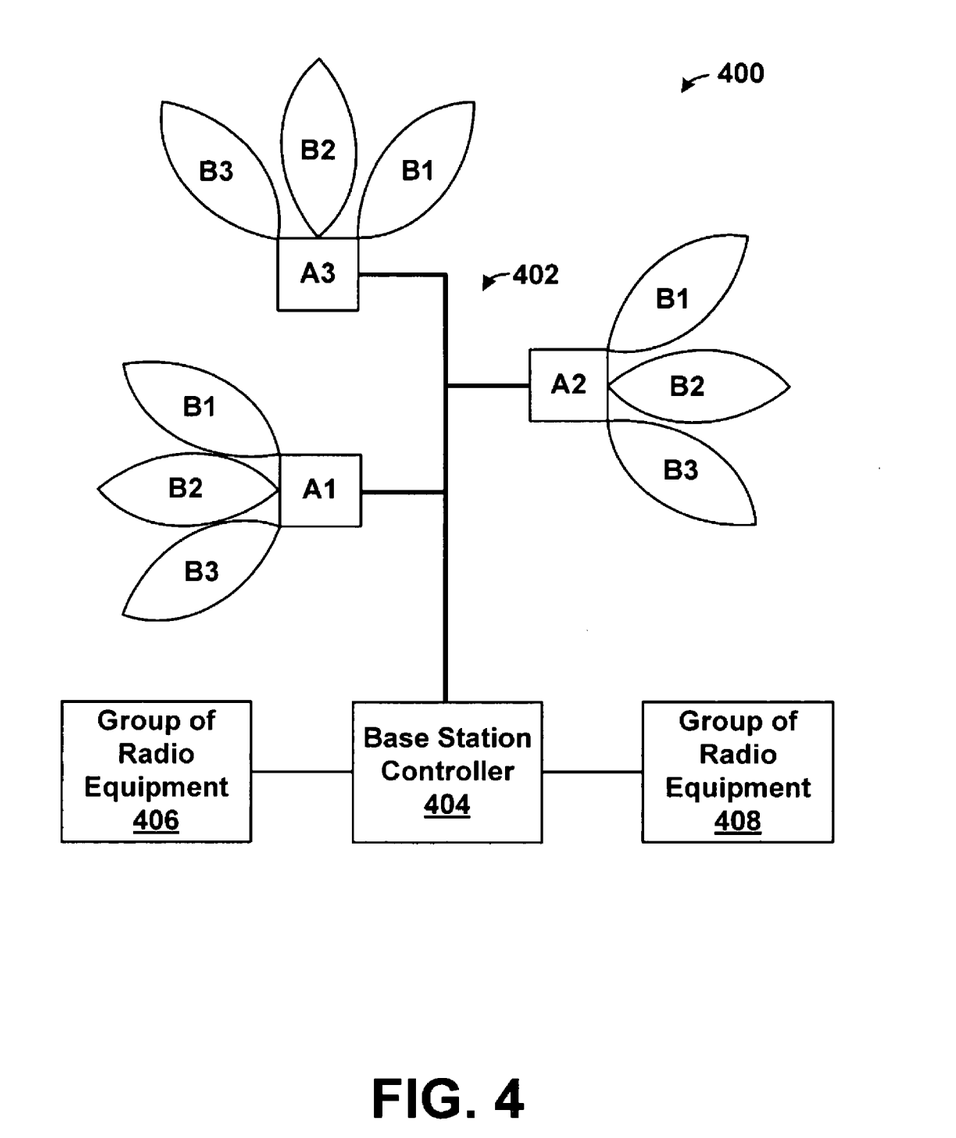
FIG. 4 illustrates another embodiment of a cell site.

FIG. 4 illustrates another embodiment of a cell site 400. The cell site 400 may include an antenna-arrangement 402, a base station controller 404, and multiple groups of radio equipment 406 and 408. Although only two groups of radio equipment are illustrated, any number of groups of radio equipment may be used within the cell site 400.

The antenna-arrangement 402 is illustrated with three antennas, e.g., A1, A2, and A3. However, the antenna-arrangement 402 may include any number of antennas, and also more than one antenna-arrangement may be used within the cell site 400. Each of the antennas may produce multiple radiation patterns or beams. For example, each antenna in FIG. 4 is illustrated with three beams, e.g., B1, B2, and B3, although the antennas may produce more or fewer than three beams.

In one embodiment, the antenna-arrangement 402 may be shared within an in-building wireless communication system. A building will typically have only a few optimal antenna sites and a limited amount of space. Therefore, the cell site 400 enables WSPs to share one antenna-arrangement, which allows for an optimal use of the equipment. The cell site 400 may be used within facilities such as underground buildings, hotels, convention centers, shopping centers, sports arenas, large multi-tenant office buildings or elsewhere.

Figure 5:
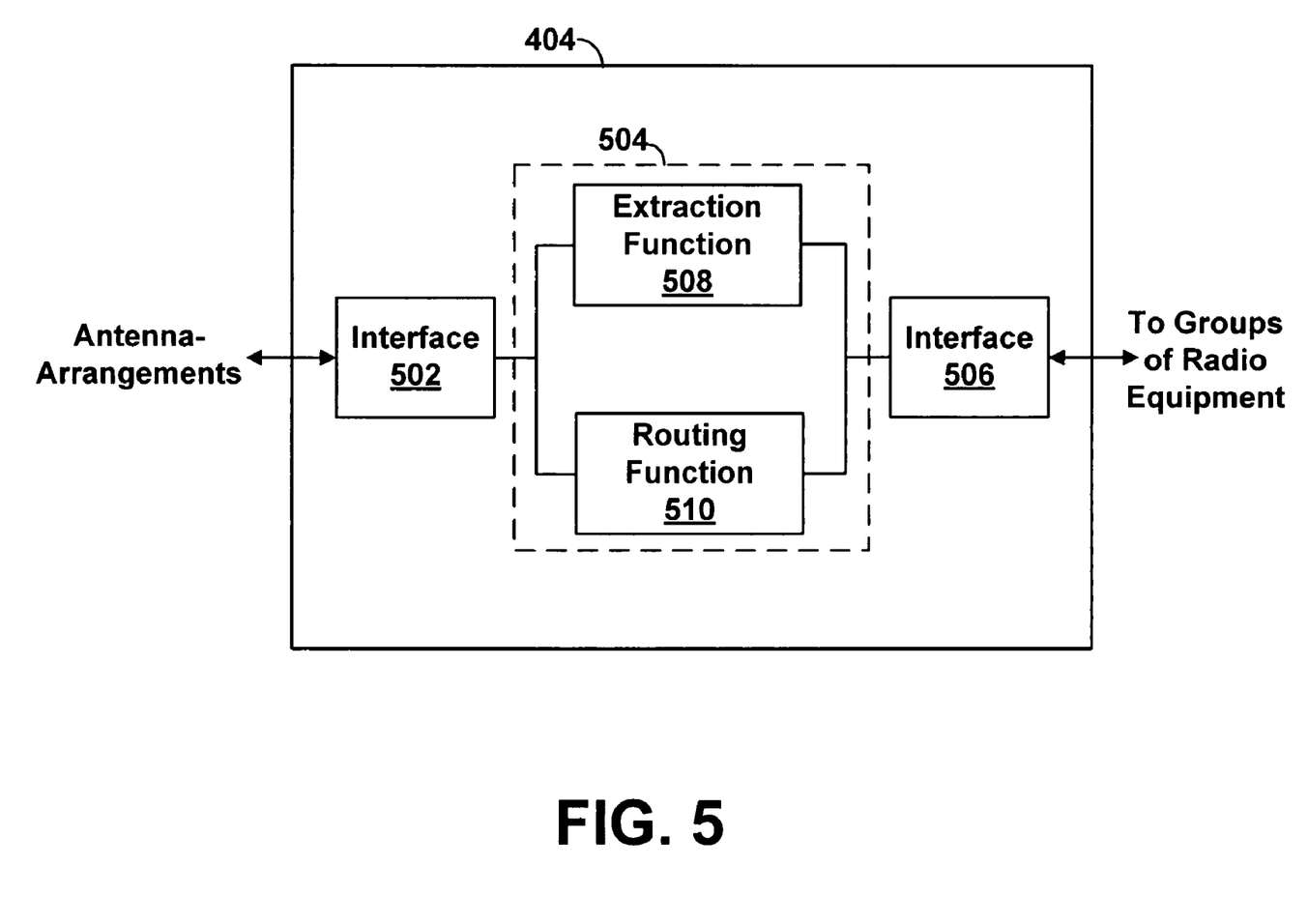
FIG. 5 illustrates one embodiment of a base station controller.

FIG. 5 illustrates one embodiment of the base station controller 404. The base station controller 404 may include an interface 502, which connects to antenna-arrangements, such as antenna-arrangement 402 of FIG. 4, a processing unit 504, and an interface 506, which connects to groups of radio equipment, such as groups of radio equipment 406 and 408 of FIG. 4. The interfaces 502 and 506 may be any communication interface that can send and receive signals.

The processing unit 504 may include an extraction function 508 and a routing function 510. These functions, and additional functions if present, of the processing unit 504 may be provided using machine language instructions or software with object-oriented machine language instructions, such as the C++ programming language. However, other programming languages (such as the C programming language for instance) could be used as well.

The processing unit 504 may operate according to an operating system, which may be any suitable commercially available embedded or disk-based operating system, or any proprietary operating system. The processing unit 504 may consist of one or more smaller processing units, including, for example, a programmable digital signal processing engine. The processing unit 504 may also be implemented as a single application specific integrated circuit (ASIC) to improve speed and to economize space.

Storage (not illustrated in FIG. 5) may also be included within the base station controller 404 and may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, compact-disc read only memory (CD-ROM), or any other volatile or non-volatile mass storage systems. Machine language instructions comprising the extraction function 508 and the routing function 510 may be stored within storage of the base station controller 404. Other data may also be stored in the storage (such as a table of data that correlates SIDs with WSPs, for instance).

The base station controller 404 may be an interface between groups of radio equipment and antenna-arrangements of a cell site. The base station controller 404 identifies the SID within wireless signals. For signals received into the base station controller 404 from an antenna-arrangement, the base station controller 404 routes the wireless signals to a wireless service provider's group of radio equipment identified by the SID. For signals received into the base station controller 404 from a group of radio equipment of a WSP, the base station controller 404 selects an antenna to radiate the signals.

Referring to FIG. 4, as an MS travels from a coverage area of one antenna to another, the mobile station's signal is identified by a nearest antenna of the cell site 400 and then forwarded to the base station controller 404. The extraction function 508 of the processing unit 504 within the base station controller 404 may be able to determine the SID of an MS signal. For example, the base station controller 404 may parse a wireless signal into frames, and then parse the frames into slots and channels. The binary string representing the SID may be within one of the channels of the signal. The base station controller 404 may extract the SID from a channel of the signal and compare it with the SIDs of the WSPs at the cell site 400.

The routing function 510 of the processing unit 504 within the base station controller 404 may be able to determine which WSP to assign a receiving antenna based at least in part on the SID within the signal. The routing function 510 may compare the SID within the signal to a table of SIDs of the WSPs operating at the cell site 400, for example. If the SID matches an SID of a WSP at the cell site 400, the base station controller 404 may route the wireless signal to the corresponding group of radio equipment.

If the SID does not match an SID of a WSP at the cell site 400, then the MS is may not be registered with a WSP that operates at the cell site 400. The base station controller 404 may route wireless signals transmitted by this MS to a group of radio equipment of a WSP that has a roaming agreement with the WSP that the MS is registered. A roaming agreement is a contract between two WSPs to allow a mobile station registered with one of the WSPs to use services of the other WSP for an additional surcharge. Typically, an MS will operate within a coverage area of its WSP. However, the MS may travel out of the coverage area of its WSP and still operate using coverage areas of other WSPs.

The extraction function 508 of the processing unit 504 within the base station controller 404 may also be able to determine the SID of a signal received at the base station controller 404 from the groups of radio equipment 406 or 408. The routing function 510 of the processing unit 504 within the base station controller 404 may then determine, based at least in part on the SID within the signal, which antenna of the antenna-arrangement 402 to send the signal to be radiated.

The base station controller 404 may also route signals (either from the antenna-arrangement 402 to a group of radio equipment or from a group of radio equipment to the antenna-arrangement 402) based also on additional factors alone or in combination with the SID of a signal. For example, the base station controller 404 may route signals based on a time of day that the signals were received or based on an availability of antennas. In addition, the base station controller 404 may route signals based on current and/or past signal traffic patterns on the antenna-arrangement 502. Furthermore, the base station controller 404 may route signals based on any combination of these factors or in combination with other additional factors as well.

In one embodiment, the base station controller 404 may follow a routine of antenna assignments or signal routing. For example, each group of radio equipment 406 and 408 may correspond to a separate WSP, such as a personal communication service provider and a wireless Internet service provider. The WSPs may have an agreement, such that between the hours of 8 AM-6 PM, the personal communication service provider may have use of a majority of the antennas, and between 6 PM-8 AM, the wireless Internet service provider may have use of the majority of antennas. The base station controller 404 may assign the antennas (e.g., A1, A2, A3) for use solely by one or the other groups of radio equipment 406 and 408 during these time periods. The routine of assignments may be determined according to past and/or predicted call models or traffic patterns.

The base station controller 404 may also dynamically assign antennas of the antenna-arrangement 402 to provide an air interface between an MS and the groups of radio equipment 406 and 408. For instance, in the above example, if during the 6 PM-8 AM time period, traffic for the wireless Internet service is low and the antennas serving the personal communication service provider are overloaded, the base station controller 404 may re-assign antennas to the group of radio equipment corresponding to the personal communication service provider. The assignment of antennas may be completed on an hourly basis or on a real-time basis dependent upon an availability of the antennas.

In another embodiment, the base station controller 404 may assign individual beams of the antennas of the antenna-arrangement 402 to the groups of radio equipment 406 and 408 based at least in part on an SID or other WSP identifier of a signal received at the antenna-arrangement 402. The antenna-beams, e.g., B1, B2, and B3, may each have a beam-identifier to enable the base station controller 404 to distinguish between them. The base station controller 404 may assign two antenna-beams of each of the antennas to group of radio equipment 406 and one antenna-beam of each of the antennas to group of radio equipment 408, based upon an agreement between the WSPs that operate the groups of radio equipment 406 and 408, or based upon incoming wireless signals.

In addition to use of the SID or other WSP identifier, the base station controller 404 may allocate antennas and/or antenna-beams based on preferred services or agreements between WSPs. For example, two WSPs may operate at a cell site that has one shared antenna-arrangement. One of the WSPs may have priority for use of the antennas. An MS that subscribes to the priority WSP may incur additional charges for priority usage of the antennas.

As an example, wireless signal traffic patterns may be present within a building. For example, between 9 AM-5 PM, a large number of mobile stations may be in use, which results in a large amount of wireless signal traffic. In addition to use of the SID or other WSP identifier, the base station controller 404 may assign beams of antennas to areas of the building that have offices during based on a time of day, such as during 9 AM-5 PM, to provide a communication medium for building employees during business hours. Similarly, between 5 PM-10 PM, other areas of a building may be populated such as a restaurant or shopping area within a basement of the building. During this time period, the base station controller 404 may direct the beams of the antennas to provide wireless service coverage to the basement area to provide a communication medium in areas not related to offices during non-business hours. The base station controller 404 may follow such a routine in order to provide effective coverage for mobile stations.

Figure 6:
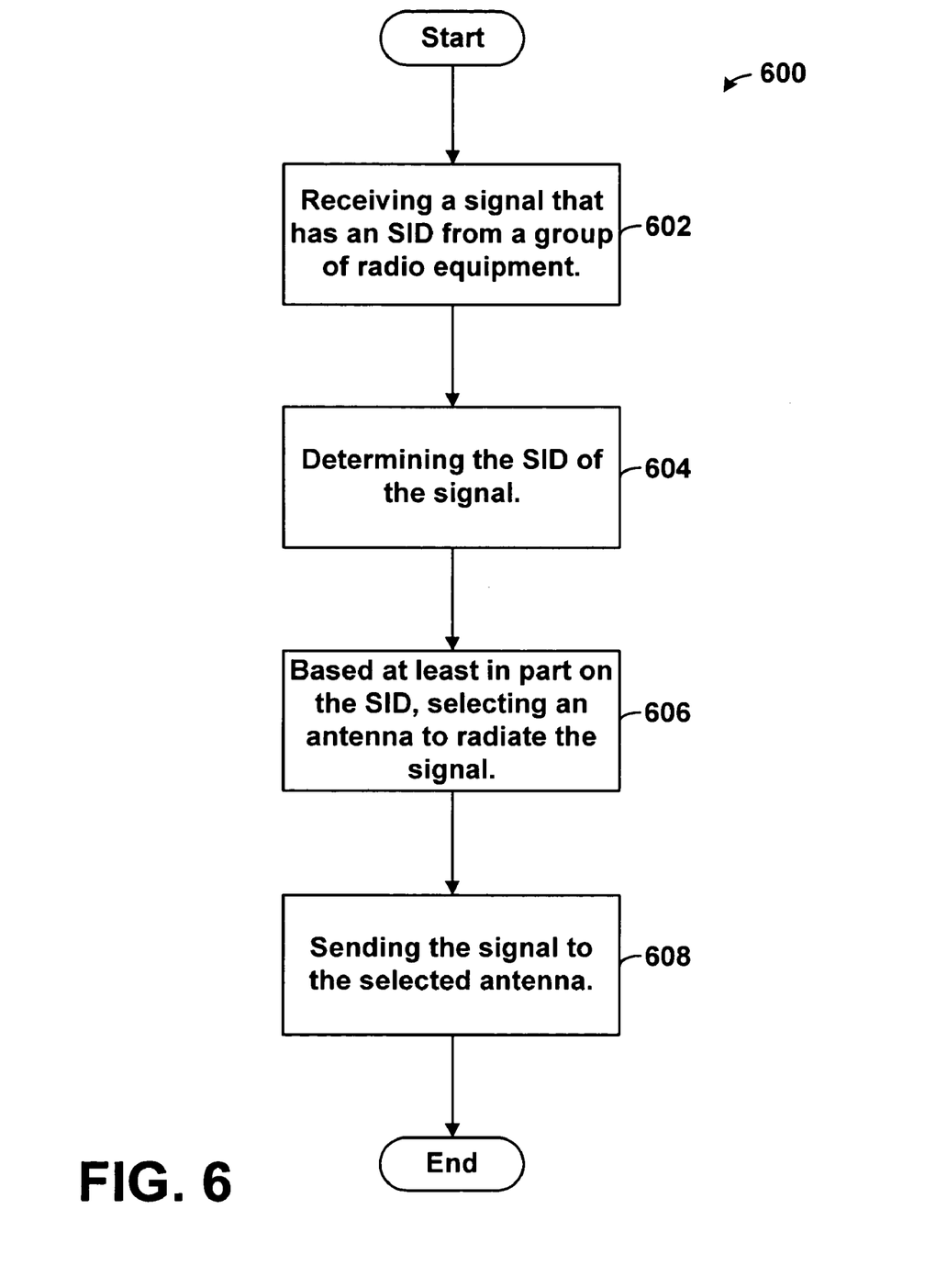
FIG. 6 is a flowchart depicting functional blocks of a method according to one embodiment.

FIG. 6 is a flowchart depicting functional blocks of a method 600 according to one embodiment. Initially, an base station controller, such as base station controller 404 illustrated in FIG. 4, may receive a signal that has an SID, as shown at block 602, directly or indirectly from one of the groups of radio equipment 406 and 408. The base station controller 404 may then determine the SID of the signal as shown at block 604, and based at least in part on the SID, the base station controller 404 may select from the antenna-arrangement 402 one or more antennas to radiate the signal, as shown at block 606, such as for example antenna A1. The base station controller 404 may then send the signal to the selected antenna (e.g., antenna A1) as shown at block 608. And antenna A1 may then radiate the signal.

The antennas, i.e., A1, A2, and A3, of the antenna-arrangement 402 may radiate a signal by modulating the signal on electromagnetic (EM) waves at a steady frequency of alternation or by other means of modulation and then emitting the EM waves in the form a radio frequency (RF) signal.

Figure 7:
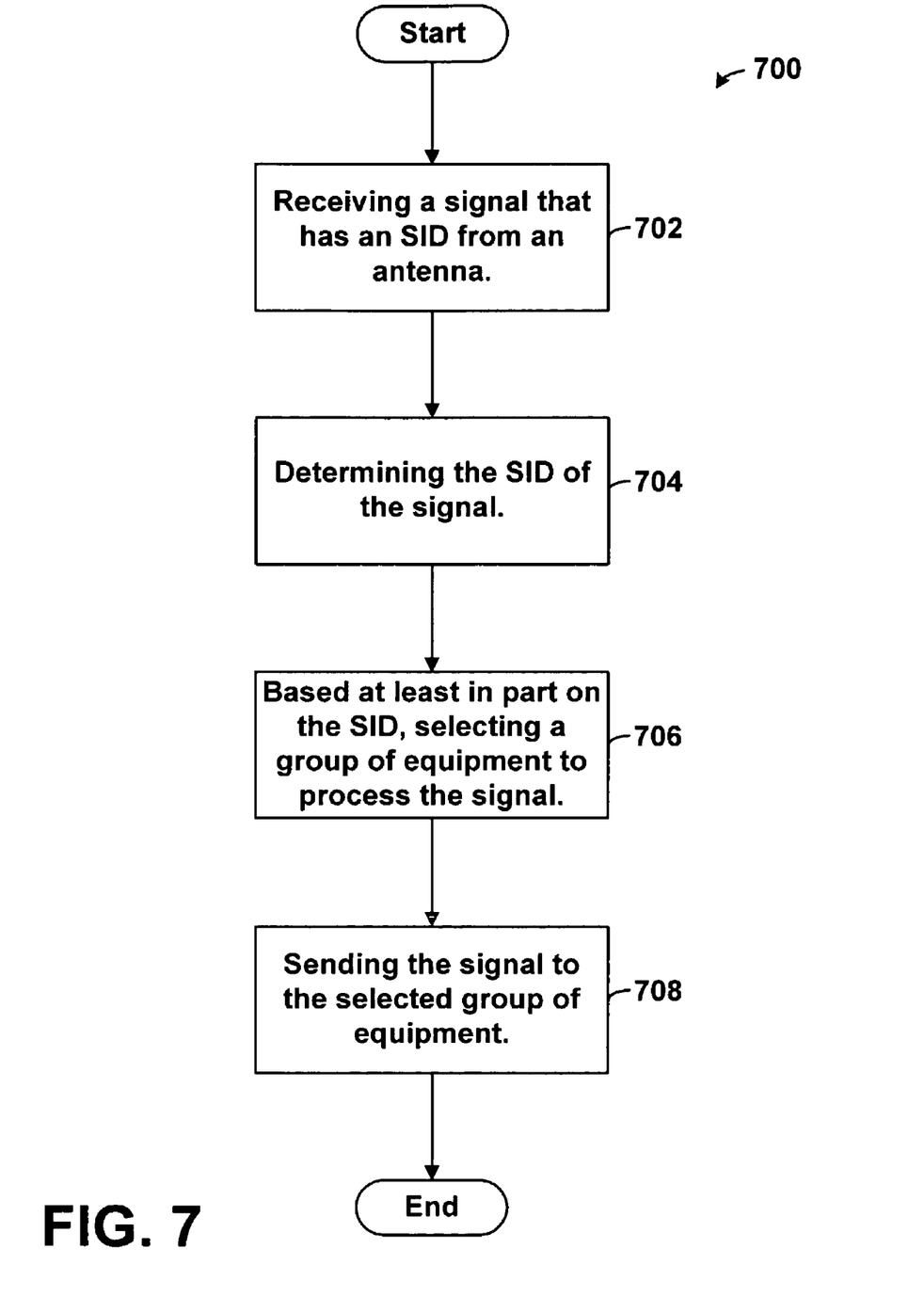
FIG. 7 is another flowchart depicting functional blocks of a method according to one embodiment.

FIG. 7 is another flowchart depicting functional blocks of a method 700 according to one embodiment. Initially, the base station controller 404 may receive a signal that has an SID, as shown at block 702, from an antenna of the antenna-arrangement 402. The base station controller 404 may then determine the SID of the signal as shown at block 704, and based at least in part on the SID, the base station controller 404 may select a group of radio equipment to process the signal, as shown at block 706. The base station controller 404 may then send the signal to the selected group of radio equipment as shown at block 708. The selected group of radio equipment may receive the signal and then process the signal.

The groups of radio equipment 406 and 408 may process signals by demodulating the signal using a modulation protocol associated with the identified SID of the signal. For example, a signal may be sent using PCM. The selected group of radio equipment may determine that the signal is pulse code modulated and then the group of radio equipment may be able to demodulate the signal using a form of PCM demodulation (i.e., coherent demodulation).

The base station controller 404 may also simultaneously receive signals, either from the antenna-arrangement 402, from the groups of radio equipment 406 and 408 or from both. The base station controller 404 may determine which of the signals are to be routed to the antenna-arrangement 402 and which of the signals are to be routed to one of the groups of radio equipment 406 or 408 according to which interface (i.e., interface 502 or interface 506) that the base station controller 404 received the signal. For example, if the signal was received into the base station controller 404 at interface 502, then the signal is to be routed to one of the groups of radio equipment 406 or 408, and if the signal was received into the base station controller 404 at interface 506, then the signal is to be routed to the antenna-arrangement 402. If the base station controller 404 simultaneously receives multiple signals from the antenna-arrangement 402, the base station controller 404 may determine which group of radio equipment to route the signals based at least in part on the SID of the signals and send the signals substantially simultaneously to their selected respective groups of radio equipment. Similarly, the base station controller 404 may simultaneously select antennas to radiate signals that the base station controller 404 simultaneously received from the groups of radio equipment 406 and 408.

C. Types of Antennas

In one embodiment, the antennas of the antenna-arrangement 204 illustrated in FIG. 2, the antennas of the antenna-arrangements 312, 314, and 316 illustrated in FIG. 3, and/or the antennas of the antenna-arrangement 402 illustrated in FIG. 4 are directional adaptive beam-forming antennas. An adaptive antenna-arrangement can adjust to an RF environment as it changes, and dynamically alter radiation patterns to optimize the performance of a wireless communication system. The adaptive antenna-arrangement may continuously distinguish between interfering signals by calculating their directions of arrival. The adaptive antenna-arrangement can also continuously update its beam pattern based on changes in both the desired and interfering signal locations. An adaptive antenna-arrangement may provide a communication medium for an MS as the MS travels from one area to another.

The antennas of the antenna-arrangement 204, the antennas of the antenna-arrangements 312, 314, and 316, and/or the antennas of the antenna-arrangement 402 may also be fixed-beam or switched-beam antenna-arrangements that may provide individual coverage areas or overlapping coverage areas. A fixed-beam antenna may consistently provide a similar beam that has a substantially unchanging shape and beam width so that mobile stations within the beam may be provided a communication medium by the antenna. A switched-beam antenna-arrangement may divide coverage areas into several smaller coverage areas. Each portion of a coverage area is provided by a predetermined fixed-beam pattern with the greatest sensitivity located in the center of the beam and less sensitivity elsewhere. The switched-beam antenna-arrangement allows one of several predetermined fixed-beam patterns (based on weighted combinations of antenna outputs) with the greatest output power to be selected to provide a communication interface between an MS and a BTS. The switched-beam antenna-arrangement switches its beam in different directions throughout space by changing phase differences of signals used to control the antenna-arrangements.

If adaptive or switched-beam antennas are employed, one antenna may provide a communication medium for essentially only one MS, because the antennas dynamically direct their beams to provide a changing coverage area for the MS. As the MS moves, the antennas adjust the shape and width of their beams to accommodate the MS. Alternatively, if fixed-beam antennas are employed, multiple mobile stations may concurrently use the antennas.

As another example, dual-band antennas may be used as well. For example, antennas designed to transmit within the frequency bands of 824-896 MHz and 1850-1990 MHz may be used. Also, dual band antennas such as a 2.4/5.8 GHz dual-band antenna designed for Bluetooth/IEEE-802.11a facility applications may be used in particular for an in-building wireless communication system for mobile stations that subscribe to multiple services. Other types of antennas may be used as well.

D. Other Examples

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

For example, although the term "SID" was defined by way of example to be a particular form of a system identification code, the term SID, as used herein, more generally refers to any system identifier regardless of form and regardless of how it is assigned.

In addition, while the foregoing description is presented in terms of cells and sectors, the method and system presented herein can be applied equally for any area of a wireless communication system. Furthermore, the method and system presented herein can extend equally for use in any wireless communication network (e.g., time division multiple access (TDMA) network, frequency division multiple access (FDMA) network, etc.). Other examples are possible as well.

I claim:

1. A method comprising:
   receiving a signal having a system identification code (SID);
   determining the SID of the signal;
   determining a wireless service provider associated with the SID;
   based at least in part on the wireless service provider associated with the SID, selecting one or more antenna-arrangements to radiate the signal; and
   sending the signal to the one or more antenna-arrangements, whereby the one or more antenna-arrangements radiates the signal.

2. The method of claim 1, wherein determining the SID of the signal comprises parsing the signal into respective frames, slots, and channels and extracting the SID from a respective control channel.

3. The method of claim 1, wherein the one or more antenna-arrangements provide a number of coverage areas defining a cell site, and wherein the wireless service provider associated with the SID operates at the cell site.

4. The method of claim 1, wherein selecting the one or more antenna-arrangements to radiate the signal further comprises selecting the one or more antenna-arrangements based at least in part on a time of day.

5. The method of claim 1, wherein selecting the one or more antenna-arrangements to radiate the signal further comprises selecting the one or more antenna-arrangements based at least in part on current traffic on the one or more antenna-arrangements.

6. The method of claim 5, wherein selecting the one or more antenna-arrangements based at least in part on current traffic on the one or more antenna-arrangements comprises dynamically selecting the one or more antenna-arrangements.

7. The method of claim 1, wherein selecting the one or more antenna-arrangements to radiate the signal further comprises selecting the one or more antenna-arrangements based at least in part on past traffic patterns.

8. The method of claim 1, wherein selecting the one or more antenna-arrangements to radiate the signal further comprises selecting the one or more antenna-arrangements based at least in part on availability of use of the one or more antenna-arrangements.

9. The method of claim 1, wherein the one or more antenna-arrangements at least in part define antenna-beams and wherein selecting the one or more antenna-arrangements to radiate the signal comprises selecting one or more of the antenna-beams to radiate the signal.

10. A base station controller comprising:
    a communication interface for sending and receiving signals;
    a processor coupled to the communication interface; and
    machine language instructions stored in data storage and executable by the processor to perform the method steps of claim 1.

11. The base station controller of claim 10, wherein the machine language instructions are executable to perform the function of selecting the one or more antenna-arrangements to radiate the signal based also on a condition selected from the group consisting of a time of day, a current traffic pattern on the one or more antenna-arrangements, a past traffic pattern on the one or more antenna-arrangements, and an availability of use of the one or more antenna-arrangements.

12. A method comprising:
    simultaneously receiving a plurality of signals each having a respective SID, and for each respective signal of the plurality of signals:
    (a) determining the respective SID within the respective signal;
    (b) determining a wireless service provider associated with the SID;
    (c) based at least in part on the wireless service provider associated with the SID, selecting one or more antenna-arrangements to radiate the respective signal; and (d) sending the respective signal to the one or more antenna-arrangements, whereby the one or more antenna-arrangements radiates the respective signal.

13. A method comprising:

receiving a signal having a system identification code (SID);

determining the SID of the signal;

determining a wireless service provider associated with the SID;

based at least in part on the wireless service provider associated with the SID, selecting a group of equipment from a plurality of groups of equipment to process the signal, wherein each group of equipment is associated with a respective wireless service provider; and sending the signal to the group of equipment.

14. The method of claim 13, wherein receiving the signal comprises wirelessly receiving the signal.

15. The method of claim 13, wherein selecting the group of equipment from the plurality of groups of equipment to process the signal further comprises selecting the group of equipment based at least in part on a time of day.

16. The method of claim 13, wherein selecting the group of equipment from the plurality of groups of equipment to process the signal comprises selecting the group of equipment to demodulate the signal.

17. A method comprising:

simultaneously receiving a plurality of signals each having a respective SID, and for each respective signal of the plurality of signals:

(a) determining the respective SID of the respective signal;

(b) determining a wireless service provider associated with the SID;

(c) based at least in part on the wireless service provider associated with the SID, selecting a group of equipment from a plurality of groups of equipment to process the respective signal; and (d) sending the respective signal to the group of equipment.

* * * * *